United States Patent [19]

Ichinoi

[11] Patent Number: 4,661,863
[45] Date of Patent: Apr. 28, 1987

[54] COLOR VIDEO SIGNAL RECORDING AND REPRODUCING APPARATUS

[75] Inventor: Yutaka Ichinoi, Yokohama, Japan

[73] Assignee: Victor Company of Japan, Ltd., Japan

[21] Appl. No.: 596,296

[22] Filed: Apr. 3, 1984

[30] Foreign Application Priority Data

Apr. 7, 1983 [JP] Japan .................... 58-61292

[51] Int. Cl.[4] .................. H04N 9/495; H04N 5/76; H04N 9/491
[52] U.S. Cl. .................. 358/334; 358/343; 358/330; 360/19.1; 360/23
[58] Field of Search .............. 358/310, 330, 334, 11, 358/12, 14, 343; 360/9.1, 18, 19.1, 23

[56] References Cited

U.S. PATENT DOCUMENTS

| | | | |
|---|---|---|---|
| 4,001,875 | 1/1977 | Le Parquier | 358/14 X |
| 4,003,077 | 1/1977 | Hickok | 358/14 X |
| 4,090,214 | 5/1978 | Wright | 358/14 X |
| 4,178,606 | 12/1979 | Hirota | 358/328 |
| 4,213,143 | 7/1980 | Jones et al. | 358/320 |
| 4,245,235 | 1/1981 | Poetsch | 358/14 |
| 4,486,789 | 12/1984 | Hirota et al. | 358/338 |
| 4,543,598 | 9/1985 | Oliphant | 358/11 |

FOREIGN PATENT DOCUMENTS

81/03098 10/1981 PCT Int'l Appl. .

OTHER PUBLICATIONS

Fernseh- und Kinotechnik, 1980, No. 12, pp. 451–458.

Primary Examiner—Aristotelis M. Psitos
Attorney, Agent, or Firm—Andrus, Sceales, Starke & Sawall

[57] ABSTRACT

A color video signal recording and reproducing apparatus comprises a first circuit for generating a low-frequency luminance signal, a second circuit for forming a time base compressed line-sequential color difference signal, a circuit for generating a time-division-multiplexed signal in which the output signals of the first and second circuits are multiplexed in time-sequence, a modulator for frequency-modulating a carrier by the time-division-multiplexed signal, a first converter for generating a low-band converted high-frequency luminance signal, a circuit for recording a frequency-division-multiplexed signal of at least the output signals of the modulator and the first converter on a recording medium and reproducing the same from the recording medium, a second converter for obtaining a reproduced high-frequency luminance signal from the reproduced signal, a circuit for obtaining a reproduced luminance signal from the reproduced high-frequency luminance signal and a reproduced low-frequency luminance signal obtained from the reproduced signal, and a circuit for obtaining a reproduced color video signal by mixing a reproduced carrier chrominance signal which is obtained from the time base compressed line-sequential color difference signal and the reproduced luminance signal.

8 Claims, 12 Drawing Figures

COLOR VIDEO SIGNAL RECORDING AND REPRODUCING APPARATUS

BACKGROUND OF THE INVENTION

The present invention generally relates to color video signal recording and reproducing apparatuses, and more particularly to a color video signal recording and reproducing apparatus in which a time base compressed line sequential color difference signal which is obtained by time base compressing a line-sequential color difference signal is time-division-multiplexed with a low-frequency component of a luminance signal so as to obtain a time-division-multiplexed video signal, and a frequency modulated signal which is obtained by frequency-modulating the time-division-multiplexed signal is recorded on a recording medium together with a high-frequency component of the luminance signal, and further, a signal which is reproduced from the recording medium is subjected to a signal processing complementary to the signal processing carried out at the time of the recording so as to obtain a reproduced color video signal which is in conformance with a standard system.

Among the existing color video signal recording and reproducing apparatuses such as a video tape recorder (VTR), the popular recording and reproducing apparatus employ the following recording and reproducing method. That is, a luminance signal and a carrier chrominance signal are separated from a composite color video signal of a standard system such as the NTSC, PAL, and SECAM systems. The separated luminance signal is frequency-modulated, and the separated carrier chrominance signal is frequency-converted into a low-frequency band. The frequency converted carrier chrominance signal is frequency-division-multiplexed with the frequency modulated luminance signal, and this frequency-division-multiplexed signal is recorded on a recording medium. At the time of a reproduction, a signal which is reproduced from the recording medium is subjected to a signal processing which is complementary to the signal processing carried out at the time of the recording, so as to obtain a reproduced composite color video signal which is in conformance with the original standard system. In other words, the popular recording and/or reproducing apparatuses employ the so-called low-band conversion recording and reproducing system.

The recording and reproducing apparatus employing the low-band conversion recording and reproducing system, has the following advantages. (I) Because the frequency band of the luminance signal can be selected arbitrarily, the apparatus is especially advantageous when applied to a home use VTR in which the frequency band in which the recording and reproduction can be carried out is relatively narrow. (II) A demodulated chrominance signal is uneasily affected by a time base deviation upon reproduction in the VTR. (III) There is little beat interference because only the luminance signal passes through frequency modulating and frequency demodulating systems, and a pilot signal is not recorded and reproduced. (IV) The frequency modulated luminance signal has a high-frequency biasing effect, and enables recording of the carrier chrominance signal with a satisfactory linearity.

On the other hand, there is a trend to lengthen the recording and reproducing times of the recording and reproducing apparatus, and there is thus a trend to lower the traveling speed of a magnetic tape which is used as the recording medium. Further, there is a demand to enable reproduction of an audio signal with a higher quality. However, since the audio signal is recorded on and reproduced from the magnetic tape by a stationary head, the relative linear velocity between the magnetic tape and the stationary head is small. For this reason, when the traveling speed of the magnetic tape is reduced, the frequency characteristic of the audio signal becomes greatly deteriorated compared to the frequency characteristic of the video signal which is recorded on and reproduced from the magnetic tape by a plurality of rotary video heads. Therefore, it was impossible to record and reproduce the audio signal with a high quality.

Thus, another recording and reproducing system was proposed. According to this proposed recording and reproducing system, the audio signal is converted into a predetermined signal format, and the audio signal having this converted signal format is superimposed on the video signal. The superimposed signal is recorded on and reproduced from the magnetic tape by the rotary video heads. In this proposed recording and reproducing system, the audio signal is recorded on and reproduced from the magnetic tape by the rotary video heads which have a high relative linear velocity with respect to the magnetic tape. For this reason, even in a case where the traveling speed of the magnetic tape is slow, the audio signal can be recorded and reproduced with a quality which is far superior to the quality with which the audio signal can be recorded and reproduced by the stationary head in a state where the traveling speed of the magnetic tape is not reduced.

However, in the recording and reproducing apparatus employing the low-band conversion system described before, two signals, that is, the luminance signal and the carrier chrominance signal must be transmitted in the narrow frequency band. Hence, the frequency band in which the frequency-division-multiplexed signal made up of the frequency modulated luminance signal and the frequency converted carrier chrominance signal is recorded and reproduced, had to be set to a narrow frequency band. Accordingly, the frequency band in which the luminance signal was recorded and reproduced was narrow, and thus, it was impossible to improve the resolution. Moreover, in the proposed recording and reproducing system in which the audio signal is recorded on and reproduced from the same track as the video signal by the rotary video heads with the low-band recording and reproducing system described before, the recording and reproduction were carried out by arranging a frequency modulated audio signal which is obtained by frequency-modulating a carrier by the audio signal into an unoccupied frequency band between the frequency converted carrier chrominance signal and the frequency modulated luminance signal. Therefore, in this proposed recording and reproducing system, the frequency band of the frequency modulated luminance signal became further limited due to the frequency modulated audio signal, and there was a disadvantage in that the resolution became poorer.

SUMMARY OF THE INVENTION

Accordingly, it is a general object of the present invention to provide a novel and useful color video signal recording and reproducing apparatus in which the disadvantages described heretofore have been eliminated.

Another and more specific object of the present invention is to provide a color video signal recording and reproducing apparatus in which a luminance signal is divided into a high-frequency component and a low-frequency component, the low-frequency component of the luminance signal is time-division-multiplexed with a time base compressed line-sequential color difference signal and a horizontal synchronizing signal so as to obtain a time-division-multiplexed signal, the high-frequency component of the luminance signal is frequency-converted into a frequency band which is lower than a frequency band of a frequency modulated time-division-multiplexed signal which is obtained by frequency-modulating a carrier by the time-division-multiplexed signal, so as to obtain a low-band converted high-frequency luminance signal, the low-band converted high-frequency luminance signal is frequency-division-multiplexed with the frequency modulated time-division-multiplexed signal so as to obtain a frequency-division-multiplexed signal, and the frequency-division-multiplexed signal is recorded on a recording medium. At the time of a reproduction, a signal which is reproduced from the recording medium is subjected to a signal processing which is complementary to the signal processing carried out at the time of the recording, so as to obtain a reproduced color video signal.

According to the apparatus of the present invention, it is possible to widen the frequency band in which the luminance signal is recorded and reproduced, compared to the frequency band in which the luminance signal is recorded and reproduced in the existing recording and reproducing apparatus employing the low-band conversion recording and reproducing system. Further, it is also possible to widen the frequency band in which the luminance signal is recorded and reproduced, compared to the frequency band in which the luminance signal is recorded and reproduced in the recording and reproducing apparatus which records the frequency modulated audio signal and the video signal on the same track. As a result, the resolution obtained by the apparatus according to the present invention, is improved over the resolution obtainable in the two types of recording and reproducing apparatuses described above.

Still another object of the present invention is to provide a color video signal recording and reproducing apparatus in which a comb filter is supplied with an output signal of frequency converting means which frequency-converts the low-band converted high-frequency luminance signal within the signal which is reproduced from the recording medium back to the original frequency band, which comb filter eliminates a crosstalk component from an adjacent track from within the output signal of the frequency converting means. An analog memory or a digital memory is used for a delay circuit within the comb filter. A delay quantity of the delay circuit is variably controlled by a clock pulse which includes a time base deviation introduced at the time of the reproduction. According to the apparatus of the present invention, it is possible to effectively eliminate the crosstalk component from the adjacent track, without being affected by the time base deviation introduced at the time of the reproduction.

Further, the present invention is not limited to these embodiments, but various variations and modifications may be made without departing from the scope of the present invention.

DETAILED DESCRIPTION

Figure 1:
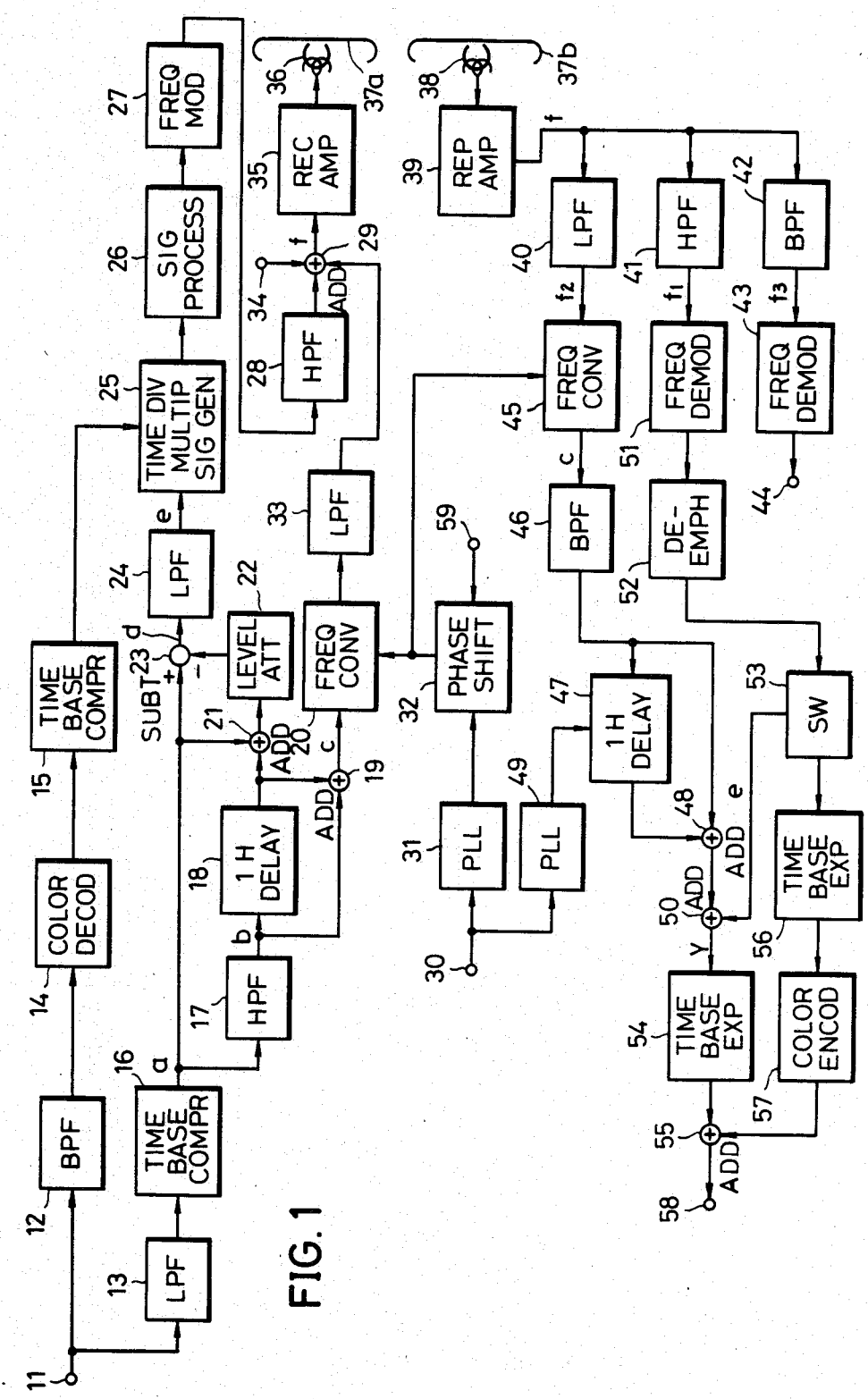
FIG. 1 is a systematic block diagram showing a first embodiment of a color video signal recording and reproducing apparatus according to the present invention.

In FIG. 1, a standard system color video signal is supplied to a bandpass filter 12 through an input terminal 11. A carrier chrominance signal is separated in the bandpass filter 12. The color video signal from the input terminal 11 is also supplied to a lowpass filter 13 wherein a luminance signal is separated. The carrier chrominance signal from the bandpass filter 12, is supplied to a color decoder 14 wherein the carrier chrominance signal is demodulated into two kinds of color difference signals (for example, the color difference signals (R-Y) and (B-Y)) and then converted into a line-sequential color difference signal in which the two kinds of color difference signals are multiplexed in time-sequence for every one horizontal scanning period (1H). The line-sequential color difference signal from the color decoder 14, is supplied to a time base compressing circuit 15 wherein the line-sequential color difference signal is time base compressed to approximately 1/5 so as to be transmitted within approximately 20% of a video duration which excludes a horizontal blanking period in a duration of 1H.

Figure 2:
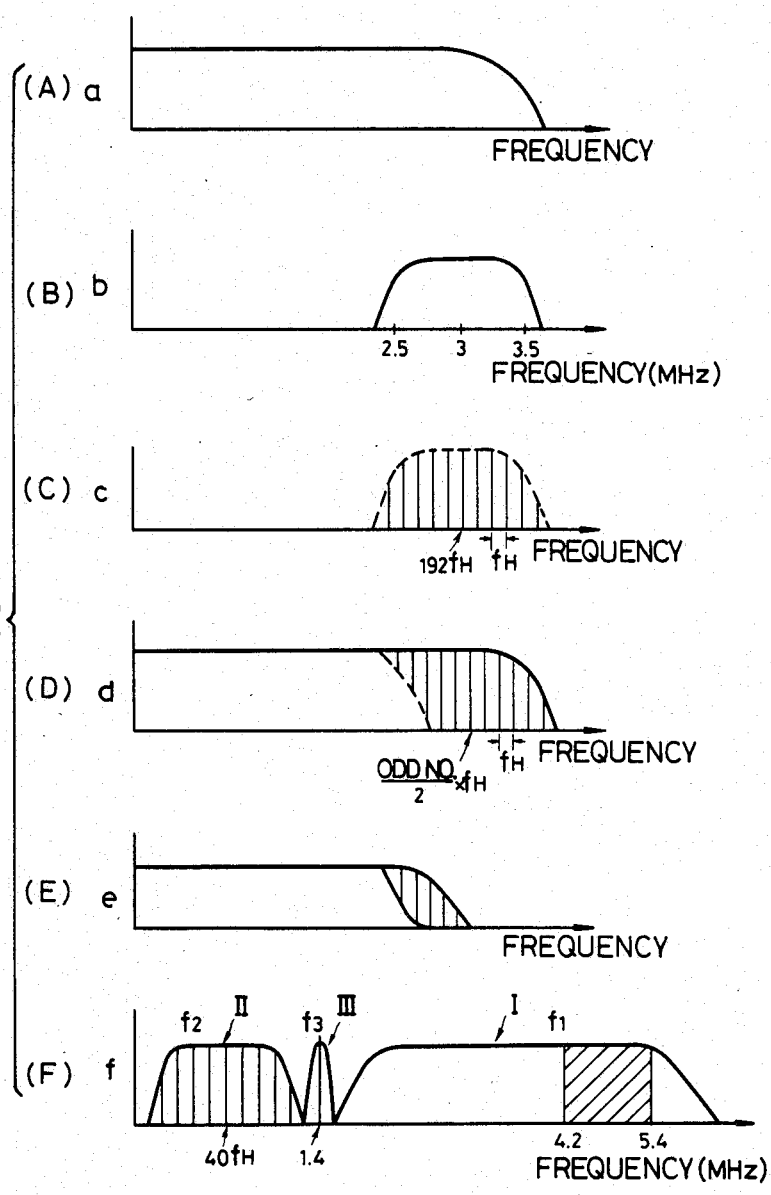
FIGS. 2(A) through 2(F) show frequency spectrums of signals at each part of the block system shown in FIG. 1.

On the other hand, the luminance signal which is separated in the lowpass filter 13 with a frequency band which is wider compared to the conventional apparatus, is supplied to a time base compressing circuit 16 wherein the luminance signal is time base compressed to approximately 4/5 so as to be transmitted within approximately 80% of the video duration. Accordingly, a time base compressed luminance signal a having a frequency spectrum shown in FIG. 2(A), is obtained from the time base compressing circuit 16. The frequency band of this time base compressed luminance signal a is approximately 5/4 times the frequency band of the input luminance signal, for example. The construction of the time base compressing circuits 15 and 16 are known from the U.S. Pat. No. 4,245,235, for example.

The time base compressed luminance signal a from the time base compressing circuit 16, is supplied to a highpass filter 17 wherein a high-frequency component is separated. A time base compressed high-frequency luminance signal (a high-frequency component of the time base compressed luminance signal) b having a frequency spectrum shown in FIG. 2(B), is obtained from the highpass filter 17 and supplied to an adding circuit 19 through a 1H delay circuit 18. The time base compressed high-frequency luminance signal from the highpass filter 17, is also supplied directly to the adding circuit 19. The 1H delay circuit 18 and the adding circuit 19 constitute a comb filter. Only a signal component c in the time base compressed high-frequency luminance signal b, having a line correlation, is obtained from the adding circuit 19 and supplied to a frequency converter 20. The high-frequency component c of the time base compressed luminance signal, which is obtained from the adding circuit 19, has a frequency spectrum shown in FIG. 2(C). As seen from FIG. 2(C), the high-frequency component c is solely made up of frequency components which are integral multiples of a horizontal scanning frequency $f_H$, and a frequency in the vicinity of the center of the frequency band is $192f_H$, for example.

On the other hand, the delayed time base compressed high-frequency luminance signal from the 1H delay circuit 18, which has been delayed by 1H, is supplied to an adding circuit 21 wherein the delayed time base compressed high-frequency luminance signal is added with the time base compressed luminance signal a. An output signal of the adding circuit 21 is supplied to a level attenuator 22 wherein the level of the signal is attenuated by ½. An output signal of the level attenuator 22 is supplied to a subtracting circuit 23. The subtracting circuit 23 subtracts the output signal of the level attenuator 22 from the time base compressed luminance signal a from the time base compressing circuit 16, and produces a signal d having a frequency spectrum shown in FIG. 2(D). In the full frequency band of the time base compressed luminance signal a from the time base compressing circuit 16, the low-frequency band which is blocked in the highpass filter 17 remains unchanged, as shown in FIG. 2(D). On the other hand, in the passing frequency band of the highpass filter 17, the output signal d of the subtracting circuit 23 is solely made up of frequency components which are odd number multiples of ½ the horizontal scanning frequency $f_H$. The time base compressed luminance signal d from the subtracting circuit 23 is supplied to a lowpass filter 24 wherein high-frequency components over a predetermined frequency are eliminated. As a result, a signal e having a frequency spectrum shown in FIG. 2(E) is obtained from the lowpass filter 24 and supplied to a time-division-multiplexed signal generating circuit 25.

The cutoff frequency of the lowpass filter 24 is selected to a frequency so that the frequency band of the time base compressed low-frequency luminance signal e from the lowpass filter 24 and the frequency band of the time base compressed high-frequency luminance signal c slightly overlap with each other, so that the frequency characteristics and the phase characteristics of the signals e and c satisfactorily connect at the time of the reproduction, as may be seen from FIGS. 2(C) and 2(E).

The time-division-multiplexed signal generating circuit 25 is supplied with the time base compressed line-sequential color difference signal from the time base compressing circuit 15 and the time base compressed low-frequency luminance signal e from the lowpass filter 24. This time-division-multiplexed signal generating circuit 25 generates a multiplexed signal in which a discriminating burst signal is multiplexed to the horizontal synchronizing signal with a period of 2H. The time-division-multiplexed signal generating circuit 25 is designed to sequentially and selectively produce the above multiplexed signal, the time base compressed line-sequential color difference signal, and the time base compressed low-frequency luminance signal, within a duration of 1H. Accordingly, the time-division-multiplexed signal generating circuit 25 generates a time-division-multiplexed signal in which, the two kinds of time base compressed color difference signals are alternately transmitted for every 1H, one of the time base compressed color difference signals is time-division-multiplexed with the time base compressed low-frequency luminance signal together with a horizontal synchronizing signal which is generated independently, and the discriminating burst signal for discriminating the transmission lines of the two kinds of color difference signals which constitute the line-sequential color difference signal in a reproducing system is multiplexed to the horizontal synchronizing signal in the transmission line of one of the two color difference signals.

Figure 3:
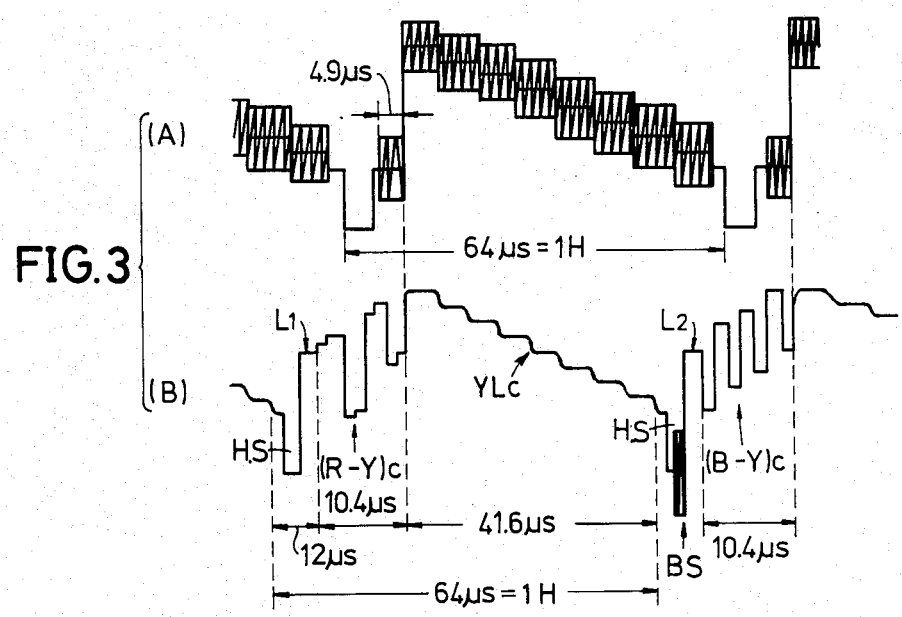
FIGS. 3(A) and 3(B) respectively show an example of a waveform of an input standard system color video signal and an example of a waveform of a time-division-multiplexed video signal.

A case will now be considered where the standard system color video signal applied to the input terminal 11, is a color bar signal having a field frequency of 50 Hz, a horizont-al scanning period of 64 µs, and a video duration of 52 µs as shown in FIG. 3(A). In this case, a time-division-multiplexed signal shown in FIG. 3(B) is generated from the time-division-multiplexed signal generating circuit 25. As shown in FIG. 3(B), a discriminating burst signal BS is multiplexed to a horizontal synchronizing signal H.S for every 1H (=64 µs). Moreover, the horizontal synchronizing signal H.S, a color reference level $L_1$ or $L_2$, one of time base compressed color difference signals $(R-Y)_c$ and $(B-Y)_c$, and a time base compressed low-frequency luminance signal $YL_c$ are time-division-multiplexed. Further, the time base compressed color difference signals are transmitted in line-sequence.

The time-division-multiplexed signal from the time-division-multiplexed signal generating circuit 25, is supplied to a signal processing circuit 26 wherein the time-division-multiplexed signal is first subjected to a pre-emphasis. Then, the pre-emphasized signal is clipped at the white peak level, and this clipped signal is supplied to a frequency modulator 27. The frequency modulator 27 performs a frequency modulation so that the synchronizing tip level becomes 4.2 MHz and the white peak level becomes 5.4 MHz, for example. A frequency modulated time-division-multiplexed signal (FM time-division-multiplexed signal) from the frequency modulator 27, is supplied to a highpass filter 28 wherein an unwanted low-frequency component is eliminated. An output signal of the highpass filter 28 is supplied to an adding circuit 29.

On the other hand, the horizontal synchronizing signal is separated from the standard system color video signal and applied to an input terminal 30, is supplied to a phase locked loop (PLL) 31. A signal which is in phase with the horizontal synchronizing signal is obtained from the PLL 31 and supplied to a phase shifting circuit 32. This phase shifting circuit 32 has a known construction which is disclosed in the U.S. Pat. No. 4,178,606, for example. A so-called drum pulse which is in phase with the rotational phase of a recording head means 36 and is produced by known means, is applied to the phase shifting circuit 32 through an input terminal 59. The phase shifting circuit 32 is also supplied with the output signal of the PLL 31 described before. For example, the phase shifting circuit 32 forms four kinds of square waves which have a repetition frequency of $152f_H$ and mutually differ in phase by 90°, and these four kinds of square waves are switched for every 1H so as to produce a continuous square wave in which the phase shifts in a predetermined direction for every 1H.

The direction in which the phase shifts in the continuous square wave, reverses for every one track scanning period in which the recording head means 36 forms one video track on a magnetic tape 37a. The continuous square wave from the phase shifting circuit 32 is supplied to the frequency converter 20 as a first frequency converting signal.

The frequency converter 20 performs a frequency conversion so as to obtain a frequency component which is a difference between the first frequency converting signal and the time base compressed high-frequency luminance signal c. In other words, the frequency converter 20 performs a frequency conversion to a low-frequency band so that the frequency component of the time base compressed high-frequency luminance signal having a center frequency of approximately $192f_H$ becomes an integral multiple of $\frac{1}{2}$ the horizontal scanning frequency $f_H$, that is, $40f_H$, for example, in order to produce a low-band converted time base compressed high-frequency luminance signal. An output signal of the frequency converter 20 is supplied to a lowpass filter 33 wherein an unwanted high-frequency component is eliminated, and an output signal of this lowpass filter 33 is supplied to the adding circuit 29.

The adding circuit 29 frequency-division-multiplexes the output signals of the highpass filter 28 and the lowpass filter 33, and a frequency modulated audio signal which is applied to an input terminal 34, and produces a frequency-division-multiplexed signal f having a frequency spectrum shown in FIG. 2(F). In the frequency spectrum shown in FIG. 2(F), the frequency spectrum of the FM time-division-multiplexed signal from the highpass filter 28 is represented by I, and the deviation frequency band of the carrier is shown by oblique lines. The frequency spectrum of the low-band converted time base compressed high-frequency luminance signal from the lowpass filter 33, having $40f_H$ as its center frequency, is represented by II. Further, the frequency spectrum of the FM audio signal which is applied to the input terminal 34 and has the frequency band of 1.4 MHz±100 kHz, for example, is represented by III.

Figure 4:
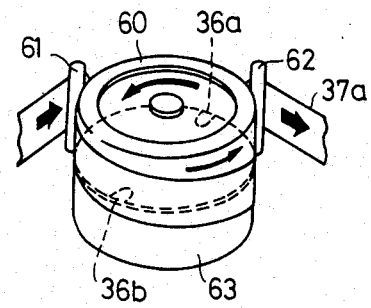
FIG. 4 is a perspective view showing a state where a recording head makes contact with a magnetic tape.

The frequency-division-multiplexed signal f is supplied to the recording head means 36 through a recording amplifier 35, and is recorded on the magnetic tape 37a by the recording head means 36. For example, the recording head means 36 may comprise a pair of magnetic heads 36a and 36b which are angularly separated by 180° and are mounted on a rotating plane of an upper rotary drum 60, as shown in FIG. 4. These magnetic heads 36a and 36b have gaps of mutually different azimuth angles. The magnetic tape 37a is guided by guide poles 61 and 62 as shown in FIG. 4, and is wrapped obliquely around the upper rotary drum 60 and a lower stationary drum 63 over an angular range of approximately 180° along a tape guide band which is formed obliquely on the lower stationary drum 63. The tape 37a is moved in a state pinched between a capstan and a pinch roller which are not shown in FIG. 4. In FIG. 4, the upper rotary drum 60 is rotated counterclockwise.

Figure 5:
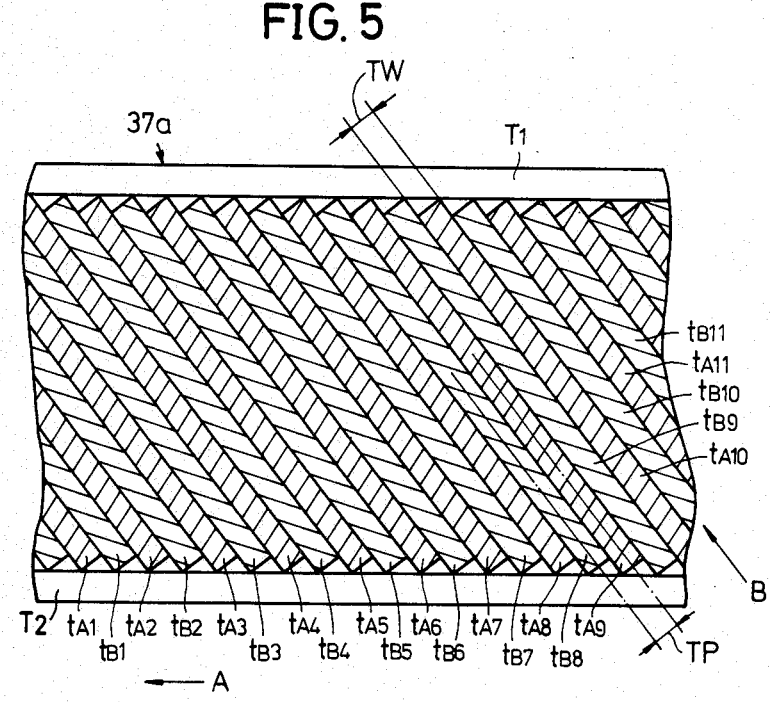
FIG. 5 shows an example of a track pattern formed on the magnetic tape.

By the magnetic heads 36a and 36b shown in FIG. 4 of the known rotary 2-head system VTR, video tracks $t_{A1}$ through $t_{A11}$ and $t_{B1}$ through $t_{B11}$ are formed on the tape 37a as shown in FIG. 5. These video tracks $t_{A1}$ through $t_{A11}$ and $t_{B1}$ through $t_{B11}$ have a track width TW, and are formed with a track pitch TP without a guard band (or so that the guard band is extremely narrow). The frequency-division-multiplexed signal f having the frequency spectrum shown in FIG. 2(F) and corresponding to one field, is recorded on one video track. Actually, there is a slight overlap recording section on the track, and the frequency-division-multiplexed signal corresponding to slightly more than one field is recorded on one track. The video tracks $t_{A1}, t_{A2}, t_{A3}, \ldots, t_{A11}$ on the tape 37a are formed by the magnetic head 36a, and the video tracks $t_{B1}, t_{B2}, t_{B3}, \ldots, t_{B11}$ on the tape 37a are formed by the magnetic head 36b. Accordingly, between two adjacent video tracks on the tape 37a, the first frequency-division-multiplexed signal is recorded by the magnetic head 36a on one of the two adjacent video tracks, and the second frequency-division-multiplexed signal is recorded by the magnetic head 36b on the other of the two adjacent video tracks. Accordingly, the two mutually adjacent video tracks on the tape 37a are recorded by the magnetic heads having gaps of mutually different azimuth angles. Moreover, the low-band converted time base compressed high-frequency luminance signals which are recorded on the two mutually adjacent tracks, have mutually different phase shifting directions.

In FIG. 5, the tape 37a is moved in the direction of an arrow A. As is well known, an audio track $t_1$ is formed by an audio head and a control track $T_2$ is formed by a control head, together with the video tracks described before. The magnetic heads 36a and 36b scan in the direction of an arrow B.

Next, description will be given with respect to the operation of the apparatus at the time of a reproduction. The frequency-division-multiplexed signal f which is recorded on a magnetic tape 37b in the same manner as the magnetic tape 37a described before, is reproduced by a reproducing head means 38 which is constructed similarly as the recording head means 36 and comprises a pair of magnetic heads. The frequency-division-multiplexed signal f which is reproduced by the reproducing head means 38, is supplied to a lowpass filter 40, a highpass filter 41, and a bandpass filter 42, through a reproducing amplifier 39. An FM audio signal $f_3$ having the frequency spectrum III shown in FIG. 2(F), is separated in the bandpass filter 42. This FM audio signal is passed through a frequency demodulator 43, and is produced through an output terminal 44 as a reproduced audio signal.

On the other hand, a reproduced low-band converted time base compressed high-frequency luminance signal $f_2$ having the frequency spectrum II shown in FIG. 2(F), is separated in the lowpass filter 40. This low-band converted time base compressed high-frequency luminance signal $f_2$ is supplied to a frequency converter 45 wherein a frequency conversion is performed so as to obtain a frequency component which is a sum of the signal $f_2$ and a second frequency converting signal from the phase shifting circuit 32. As a result, a reproduced time base compressed high-frequency luminance signal c having the original frequency band in the frequency spectrum shown in FIG. 2(C), is produced from the frequency converter 45. The reproduced time base compressed high-frequency luminance signal c is supplied to a 1H delay circuit 47 and an adding circuit 48, through a bandpass filter 46. The 1H delay circuit 47 and the adding circuit 48 constitute a comb filter for eliminating the crosstalk. The 1H delay circuit 47 is constituted by an analog memory such as a charge coupled device (CCD), or a digital memory such as a random access memory (RAM). The delay quantity of the 1H delay circuit 47 is variably controlled about a delay quantity of 1H, responsive to a clock pulse from a PLL 49.

At the time of the reproduction, a reproduced horizontal synchronizing signal having the same time base deviation (jitter) as the reproduced signal, is supplied to the PLLs 31 and 49, through the input terminal 30. The phase shifting circuit 32 produces a square wave in which the phase is shifted by 90° in a predetermined direction for every 1H, and in which the phase shifting direction is reversed for every one track scanning period. This square wave from the phase shifting circuit 32 has the same repetition frequency as the first frequency converting signal described before, and is supplied to the frequency converter 45 as the second frequency converting signal. In the second frequency converting signal, the phase shifting direction is selected essentially in the opposite direction as the phase shifting direction at the time of the recording, so as to cancel the phase shift at the time of the recording by the frequency conversion in the frequency converter 45. The clock pulse which is supplied to the 1H delay circuit 47 from the PLL 49, includes a time base deviation which is the same as the time base deviation introduced upon reproduction. Accordingly, the delay quantity of the 1H delay circuit 47 is controlled, following the time base deviation introduced upon reproduction. Thus, the 1H delay circuit 47 and the adding circuit 48 can satisfactorily perform a comb filter operation, unaffected by the time base deviation upon reproduction.

The signal which has been recorded on a track which is adjacent to the track which is being reproduced by the reproducing head means 38, is reproduced as crosstalk. However, the FM time-division-multiplexed signal from the adjacent track, having the high frequency, will not mix into the reproduced signal due to the azimuth loss effect. On the other hand, the low-band converted time base compressed high-frequency luminance signal from the adjacent track, having the low frequency, will mix into the reproduced signal as crosstalk because the azimuth loss effect is not sufficient in this case. But by performing frequency conversions in the frequency converter 20 and 45 by use of frequency converting signals in which the phase is shifted by 90° for every 1H, it is possible to obtain from the frequency converter 45 a reproduced time base compressed high-frequency luminance signal in which the phase shift has been cancelled and in which the phase is the same for each 1H. Further, since the phase of the crosstalk component from the adjacent track included in the reproduced time base compressed high-frequency luminance signal, is inverted for every 1H as disclosed in the U.S. Pat. No. 4,178,606, the crosstalk component can be eliminated by passing the reproduced time base compressed high-frequency luminance signal through the comb filter.

A reproduced FM time-division-multiplexed signal $f_1$ having the frequency spectrum I shown in FIG. 2(F), is separated in the highpass filter 41. This reproduced FM time-division-multiplexed signal $f_1$ is frequency-demodulated into a reproduced time-division-multiplexed signal in a frequency demodulator 51. The reproduced time-division-multiplexed signal from the frequency demodulator 51, is supplied to a switching circuit 53 through a de-emphasis circuit 52. The switching circuit 53 separates the reproduced time-division-multiplexed signal into a reproduced time base compressed line-sequential color difference signal and a reproduced time base compressed low-frequency luminance signal. The reproduced time base compressed line-sequential color difference signal is supplied to a time base expanding circuit 56, and the reproduced time base compressed low-frequency luminance signal is supplied to an adding circuit 50.

The adding circuit 50 adds the time base compressed high-frequency luminance signal c which has been eliminated of the crosstalk and is obtained from the adding circuit 48, and the reproduced time base compressed low-frequency luminance signal e from the switching circuit 53. An output signal of the adding circuit 50 is supplied to a time base expanding circuit 54 wherein the signal is time base expanded to 5/4. Accordingly, a reproduced luminance signal which has been essentially returned to the original frequency band, is produced from the time base expanding circuit 54.

On the other hand, the reproduced time base compressed line-sequential color difference signal is time base expanded to 5 times in the time base expanding circuit 56, so as to obtain a reproduced line-sequential color difference signal which has been returned to the original time base. This reproduced line-sequential color difference signal from the time base expanding circuit 56 is supplied to a color encoder 57 wherein the signal is converted into a reproduced carrier chrominance signal having a signal format which is in conformance with the standard system. The reproduced carrier chrominance signal from the color encoder 57 is multiplexed with the reproduced luminance signal from the time base expanding circuit 54, in an adding circuit 55. As a result, a reproduced standard system color video signal is produced through an output terminal 58.

According to the present embodiment, the luminance signal is transmitted in a state where the high-frequency component thereof is converted into the low-frequency band. Hence, the frequency band in which the luminance signal may be recorded and reproduced can be widened compared to the conventional case, and for this reason, the resolution can be improved.

The low-band converted time base compressed high-frequency luminance signal $f_2$ has the frequency spectrum II shown in FIG. 2(F), in which signal components exist for every $f_H$ about a signal component (40$f_H$ in this case) which is an integral multiple of ½ the horizontal scanning frequency $f_H$. Hence, when the FM time-division-multiplexed signal and the low-band converted time base compressed high-frequency luminance signal are simultaneously recorded on the magnetic tape 37a and these signals are simultaneously reproduced from the magnetic tape 37b, a cross modulation component between the two signals is generated. Especially the cross modulation component of 2$f_s$ which appears within the frequency band of the FM time-division-multiplexed signal, introduces a problem in that it introduces moire in the picture, where $f_s$ is the center frequency of the low-band converted time base compressed high-frequency luminance signal and is equal to 40$f_H$ in this case. However, in the present embodiment, the cross modulation component is interleaved in the frequency spectrum of the reproduced luminance signal, and for this reason, the moire can be made visually less conspicuous by frequency interleaving.

Figure 6:
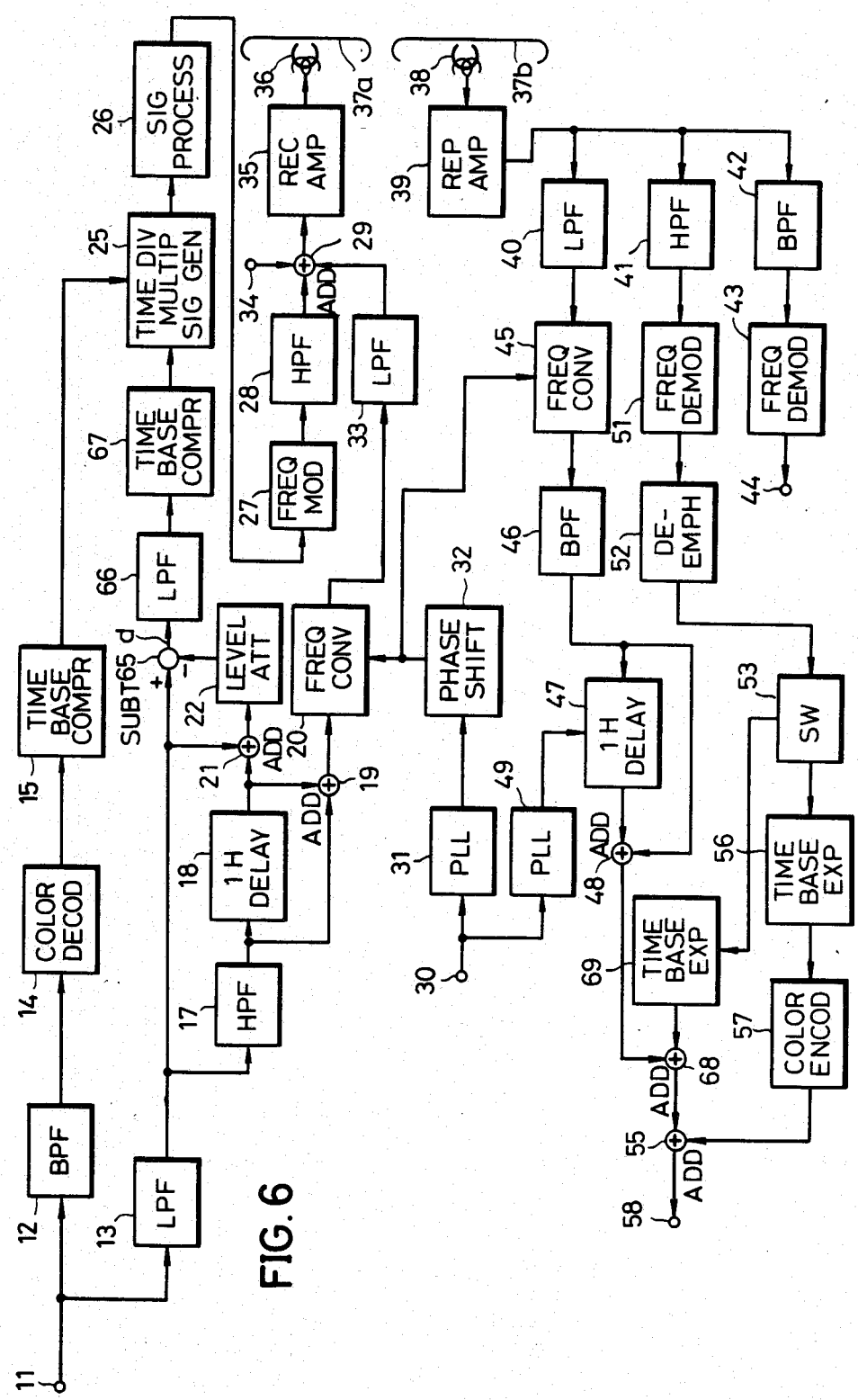
FIG. 6 is a systematic block diagram showing a second embodiment of a color video signal recording and reproducing apparatus according to the present invention.

Next, description will be given with respect to a second embodiment of a color video signal recording and reproducing apparatus according to the present invention by referring to FIG. 6. In FIG. 6, those parts which are the same as those corresponding parts in FIG. 1 are designated by the same reference numerals, and their description will be omitted. This second embodiment is different from the first embodiment in that the high-frequency component of the luminance signal (high-frequency luminance signal) is transmitted without being subjected to a time base compression. In other words, the output luminance signal of the lowpass filter 13 is supplied to a subtracting circuit 65 and to the highpass filter 17. The highpass filter 17 separates the high-frequency component of the luminance signal, and the high-frequency component is supplied to the comb filter which is made up of the 1H delay circuit 18 and the adding circuit 19. The output signal of the adding circuit 19 is supplied to the frequency converter 20 wherein the signal is frequency-converted into the low-frequency band.

On the other hand, the luminance signal d having the frequency spectrum shown in FIG. 2(D) is obtained from the subtracting circuit 65 (actually, because the time base compression is not performed, the frequency bandwidth is 4/5 the frequency bandwidth shown in FIG. 2(D)). The luminance signal d is supplied to a time base compressing circuit 67 through a lowpass filter 66. The time base compressing circuit 67 time base compressed the low-frequency component of the luminance signal and supplies the time base compressed low-frequency luminance signal to the time-division-multiplexed signal generating circuit 25. Accordingly, only the low-frequency component of the luminance signal (low-frequency luminance signal) is subjected to the time base compression, and the high-frequency component of the luminance signal is recorded by being frequency-converted into the low-frequency band without being subjected to a time base compression.

In the reproducing system, the comb filter which is made up of the 1H delay circuit 47 and the adding circuit 48, produces a reproduced high-frequency luminance signal which has not been time base compressed and has been eliminated of the crosstalk component from the adjacent track. This reproduced high-frequency luminance signal from the adding circuit 48 is supplied to an adding circuit 68. The reproduced time base compressed low-frequency luminance signal from the switching circuit 53, is supplied to a time base expanding circuit 69 wherein the reproduced time base compressed low-frequency luminance signal is time base expanded to the original time base. The adding circuit 68 produces a reproduced luminance signal by adding the reproduced low-frequency luminance signal from the time base expanding circuit 69 and the reproduced high-frequency luminance signal from the adding circuit 48. The reproduced luminance signal from the adding circuit 68 is supplied to the adding circuit 55.

The same effects as those obtained in the first embodiment described before, can be obtained according to the present embodiment.

The color video signal recording and reproducing apparatus according to the present invention is not limited to the embodiments described heretofore, and other applications are possible. Description was given heretofore with respect to a case where the video tracks are alternately formed on the magnetic tape 37a by two magnetic heads having gaps of mutually different azimuth angles, without a guard band between the two adjacent video tracks. However, the video tracks may be formed so that a guard band is formed between the two adjacent video tracks. In this case, it is unnecessary to provide means for eliminating the crosstalk from the adjacent track. In other words, it is unnecessary to provide phase shift processing means such as the phase shifting circuit 32, and the comb filter which is made up of the 1H delay circuit 47 and the adding circuit 48.

Further, in the case where the video tracks are formed essentially without the guard band, the means for eliminating the crosstalk is not limited to the phase shift processing means. It is of course possible to employ a known measure against the crosstalk, by carrying out the recording with the phase of the low-band converted high-frequency luminance signal inverted for every 1H with respect to one of the two adjacent tracks and with the phase of the low-band converted high-frequency luminance signal unchanged with respect to the other of the two adjacent tracks, and by returning the inverted phase at the time of the reproduction to supply the low-band convertered high-frequency luminance signal to a comb filter. In this case, in order to visually reduce the moire which occurs due to the cross modulation component appearing in the frequency band of the FM time-division-multiplexed signal by frequency interleaving, it is necessary to frequency-convert the high-frequency luminance signal having the center frequency $192f_H$ into a low-frequency band so that the frequency becomes an odd number multiple of $\frac{1}{4}$ the horizontal scanning frequency $f_H$.

The 1H delay circuits 18 and 47 may be used in common. Moreover, audio signals of two or more channels may be recorded and reproduced by setting the carrier frequencies of FM audio signals to mutually different frequencies. The audio signal need not be recorded on the video track, and may be recorded by a stationary audio head as in the conventional apparatus. Further, in the embodiments described heretofore, the two kinds of color difference signals are obtained by demodulating the carrier chrominance signal which is separated from the standard system color video signal, however, the present invention may be applied with respect to a luminance signal and two kinds of color difference signals which are obtained from a matrix circuit by supplying to the matrix circuit three primary color signals which are obtained by picking up an image by a television camera, for example.

In addition, the low-frequency component of the luminance signal need not be subjected to a time base compression, and may be time-division-multiplexed to the time base compressed line-sequential color difference signal by blocking the transmission during a part of the video duration. Moreover, the time base compression ratio of the time base compressed line-sequential color difference signal may be selected to a large value so that a color difference signal of 52 μs is transmitted in several μs, in order to time-division-multiplex the low-frequency component of the luminance signal to the time base compressed line-sequential color difference signal essentially without blocking and without time base compressing the low-frequency component of the luminance signal.

Further, the present invention is not limited to these embodiments, but various variations and modifications may be made without departing from the scope of the present invention.

What is claimed is:

1. A color video signal recording and reproducing apparatus comprising:
    input terminal means (11) for receiving a standard system color video signal comprising a luminance signal and a carrier chrominance signal, said carrier chrominance signal comprising two kinds of color difference signals;

time base compressed line-sequential color difference signal forming means (12, 14, 15) supplied with the standard system color video signal from said input terminal means for separating said carrier chrominance signal and for forming a time base compressed line-sequential color difference signal from the two kinds of color difference signals of said carrier chrominance signal;

first frequency separating means (13, 17) coupled to said input terminal means for separating a high-frequency component of said luminance signal from the standard system color video signal;

second frequency separating means (13, 17, 18, 21, 22, 23, 24, 65, 66) coupled to said input terminal means for separating a low-frequency component of said luminance signal from the standard system color video signal;

luminance signal time base compressing means (16, 67) for compressing a time base of said low-frequency component of said luminance signal so as to obtain a time base compressed low-frequency component of the luminance signal;

a time-division-multiplexed signal generating circuit (25) supplied with said time base compressed low-frequency component of the luminance signal and said time base compressed line-sequential color difference signal for generating a time-division-multiplexed signal in which one of said time base compressed color difference signals, and said time base compressed low-frequency component of the luminance signal are multiplexed in time-sequence within one horizontal scanning period, the two kinds of time base compressed color difference signals being alternately transmitted for every one horizontal scanning period in the time-division-multiplexed signal;

modulating means (26, 27, 28) for frequency-modulating a carrier by said time-division-multiplexed signal so as to obtain a frequency modulated time-division-multiplexed signal;

first frequency converting means (18, 19, 20, 31, 32, 33) supplied with said high-frequency component of the luminance signal from said first frequency separating means for obtaining a low-band converted high-frequency component of the luminance signal by frequency-converting the high-frequency component of said luminance signal to a frequency band which is lower than the frequency band of said frequency modulated time-division-multiplexed signal;

first mixing means (29) for mixing said frequency modulated time-division-multiplexed signal and said low-band converted high-frequency component of the luminance signal to produce a mixed signal;

recording and reproducing means (35, 36, 38, 39) for recording the mixed signal on a recording medium and reproducing the mixed signal from the recording medium;

third frequency separating means (40, 41) supplied with the mixed signal which is reproduced by said recording and reproducing means for separating the frequency modulated time-division-multiplexed signal and the low-band converted high-frequency component of the luminance signal from the mixed signal;

demodulating means (51, 52) for frequency-demodulating the frequency modulated time-division-multiplexed signal which is supplied from said third frequency separating means to obtain a reproduced time-division-multiplexed signal;

separating means (53) supplied with said reproduced time-division-multiplexed signal from said demodulating means for separating a reproduced time base compressed line-sequential color difference signal and a reproduced time base compressed low-frequency component of the luminance signal;

a carrier chrominance signal reproducing circuit (56, 57) for forming a reproduced carrier chrominance signal which is in conformance with the standard system by subjecting said reproduced time base compressed line-sequential color difference signal to a time base expansion so as to return the time base to the original time base;

second frequency converting means (31, 32, 45, 46, 47, 48, 49) supplied with the low-band converted high-frequency component of the luminance signal from said third frequency separating means for obtaining a reproduced high-frequency component of the luminance signal by frequency-converting the low-band converted high-frequency component of the luminance signal back to the original frequency band;

a luminance signal reproducing circuit (50, 54, 68, 69) supplied with said reproduced time base compressed low-frequency component of the luminance signal from said separating means and said reproduced high-frequency component of the luminace signal from said second frequency converting means for subjecting said reproduced time base compressed low-frequency component of the luminance signal to a time base expansion so as to return the time base to the original time base, and for obtaining a reproduced luminance signal in the original frequency band; and second mixing means (55) supplied with said reproduced carrier chrominance signal and said reproduced luminance signal for producing a reproduced color video signal which is in conformance with the standard system by mixing said reproduced carrier chrominance signal and said reproduced luminance signal.

2. A recording and reproducing apparatus as claimed in claim 1 in which said first frequency separating means comprises a highpass filter for separating the high-frequency component of said luminance signal, said first frequency converting means comprises a first comb filter supplied with an output signal of said highpass filter, for obtaining therefrom only a frequency component which is an integral multiple of the horizontal scanning frequency, and said second frequency converting means comprises a second comb filter located in an output stage thereof for eliminating from said reproduced high-frequency component of the luminance signal a crosstalk component from an adjacent track.

3. A recording and reproducing apparatus as claimed in claim 2 in which said second comb filter comprises a delay circuit having a delay time of one horizontal scanning period and an adding circuit for adding input and output signals of said delay circuit, and said delay circuit comprises an analog or digital memory and means for generating a clock pulse in phase with a horizontal synchronizing signal separated from a reproduced signal which is reproduced from said recording medium to drive said analog or digital memory by the clock pulse so that a delay quantity of said delay circuit is variably controlled to follow a time base deviation in said reproduced signal.

4. A recording and reproducing apparatus as claimed in claim 1 in which said second frequency separating means comprises a filter circuit for causing said low-frequency component of the lumiance signal to have an upper limit frequency selected slightly higher than a lower limit frequency of said high-frequency component of the luminance signal.

5. A recording and reproducing apparatus as claimed in claim 2 in which said first frequency converting means frequency-converts the high-frequency component of said luminance signal into a low-frequency band so that an approximate center frequency of the high-frequency component of said luminance signal becomes an integral multiple of ½ the horizontal scanning frequency, by use of a first frequency converting signal in which the phase is shifted in a predetermined direction by approximately 90° for every one horizontal scanning period and the direction of the phase shift is reversed for every one track scanning period, and said second frequency converting means frequency-converts said low-band converted high-frequency component of said luminance signal to the original frequency band by use of a second frequency converting signal which has the same repetition frequency as said first frequency converting signal, the phase of said second frequency converting signal being shifted by approximately 90° for every one horizontal scanning period essentially in a direction opposite to the phase shifting direction of said first frequency converting signal.

6. A recording and reproducing apparatus as claimed in claim 1 in which said first frequency separating means is supplied with an output signal of said luminance signal time base compressing means so that the high-frequency component of said luminance signal is subjected to a time base compression to the same extent as the low-frequency component of said luminance signal, and said luminance signal reproducing circuit comprises a circuit located in an output stage thereof for performing a time base expansion complementary to the time base compression performed in said luminance signal time base compressing means.

7. A recording and reproducing apparatus as claimed in claim 1 in which said luminance signal time base compressing means is located in an output stage of said second frequency separating means, said first frequency converting means frequency-converts the high-frequency component of the luminance signal which has not been subjected to a time base compression, and said luminance signal reproducing circuit comprises a circuit for performing a time base expansion complementary to the time base compression performed in said luminance signal time base compressing means only with respect to the reproduced time base compressed low-frequency component of the luminance signal from said separating means.

8. A recording and reproducing apparatus as claimed in claim 1 in which said first mixing means receives a frequency modulated audio signal which is obtained from said standard system color video signal and forms a frequency-division-multiplexed signal in which the output signals of said modulating means and said first frequency converting means and said frequency modulated audio signal are frequency-division-multiplexed, and said recording and reproducing means records said frequency-division-multiplexed signal on said recording medium and reproduces said frequency-division-multiplexed signal from said recording medium.

* * * * *